May 12, 1970  H. OETIKER  3,510,918
CLAMPING DEVICE
Filed Sept. 24, 1968
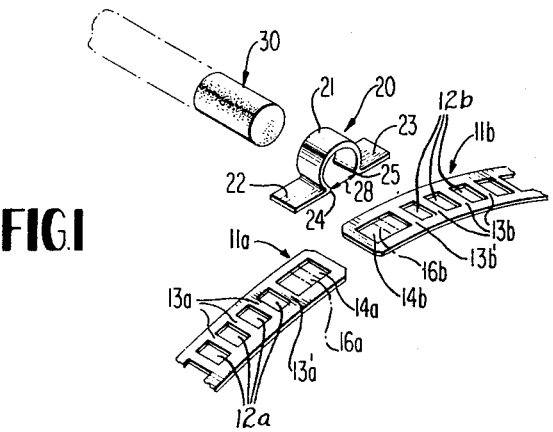
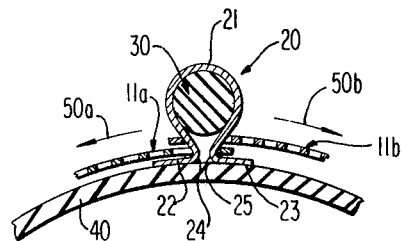
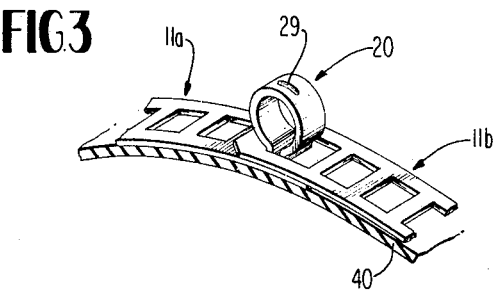
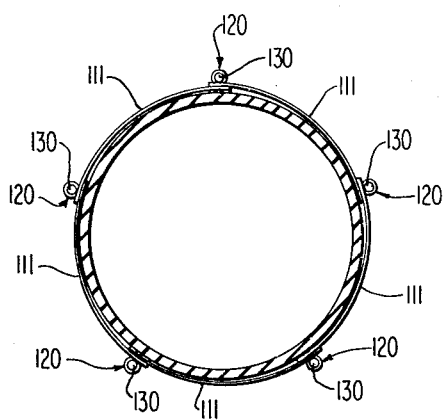
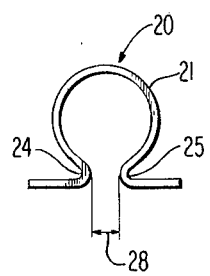
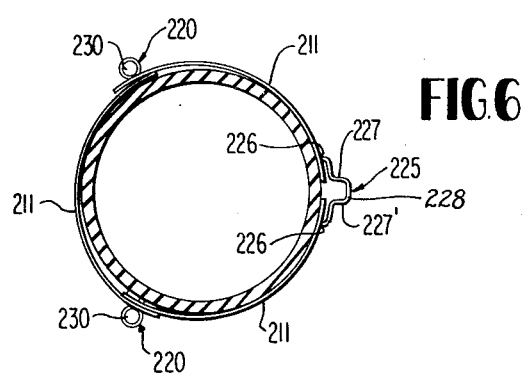
INVENTOR
HANS OETIKER
BY Craig & Antonelli
ATTORNEYS

United States Patent Office 3,510,918
Patented May 12, 1970

3,510,918
CLAMPING DEVICE
Hans Oetiker, Oberdorfstrasse 21, Horgen, Switzerland
Filed Sept. 24, 1968, Ser. No. 762,020
Int. Cl. B65d 63/02
U.S. Cl. 24—19                              23 Claims

ABSTRACT OF THE DISCLOSURE

A band clamp in which two overlapping band ends are provided with apertures, whereby the band ends are connected with each other, after the apertures are aligned, by the insertion of the fold portion of a tensional spring element through the aligned apertures from the inside of the clamp; the tensional spring element may be retained in its assembled condition by means of an insert element extending through the fold portion whereby pressure forces seeking to enlarge the diameter of the clamp will contract the inner ends of the fold portion.

---

The present invention relates to a clamping device, and more particularly to a band-type clamp which includes a self-adjusting spring element.

A hose clamp is described in my prior U.S. Pat. 2,847,742 in which a flat metal band, provided with rectangular apertures is adapted to be closed and tightened about a hose by means of a bridging member which includes hook-like end portions adapted to be inserted into the aperture and a U-shaped fold or lug which is adapted to be elastically deformed to compress the band about the hose. Additionally, this patent suggests the possibility of increasing the pressure applied to the hose by utilizing a second bridge member. To permit the contraction of the U-shaped fold or lug, a deformable material has to be used therefor. However, in certain applications and for certain purposes, one or several ears or folds are desirable which provide for an automatic re-adjustment and re-tightening of the clamp, for example, to compensate for aging, and especially in applications where pressure build-up and pressure decrease alternate frequently.

A clamp utilizing or several lugs or folds made of elastic spring material has been proposed in my Swiss patent application No. 8067/65, filed in Switzerland on June 3, 1965 and now Swiss Pat. No. 442,902, issued Jan. 31, 1968. Folds or lugs forming tensional spring elements are proposed in this Swiss application which are made from highly elastic, flexible band material and which have a shape substantially resembling the shape of the ear or fold made from deformable material upon contraction thereof.

However, the clamps of my prior U.S. Pat. 2,847,742 as well as of my Swiss patent application 8067/65 entail certain disadvantages.

If a pressure build-up occurs in the line, i.e., within the hose, the ears or folds are able to yield to permit breathing of the rubber or plastic hose material. However, such pressure increase causes the gap between the inner ends of the folds or lug to become larger which, apart from problems of material fatigue, may lead to bulging of the hose at the place of a gap.

The present invention aims at eliminating the aforementioned shortcomings and drawbacks and essentially consists in providing a lug or fold of the type described above which, upon increase of pressure within the hose, reduces the gap between the inner ends of the fold or lug and places the lug or fold under additional elastic stress. This is achieved by using an approximately ear-shaped or similarly shaped lug or fold, for example, of approximately omega-shape, whose inner ends pass over by way of well-defined curvatures of relatively small radii of curvature into oppositely directed leg portions whereby the ear-shaped fold or lug is instered through aligned apertures of mutually overlapping band ends so that, upon increase of pressure within the hose, the web portions of the respective apertures engage at the places of transitions and seek thereby to contract the ear-shaped fold, i.e., to reduce the gap between the inner ends, whereby the lug or fold is subjected to additional stresses opposing the increase in the diameter of the band clamp. If so desired, a small elastic piece, for example, made from rubber or elastic synthetic resinous material of a shape complementary to the shape of the ear, may be inserted into the same after the ear is inserted through the aligned apertures of the overlapping band ends to hold together the parts. Additionally, the elastic insert element may reinforce the elasticity of the ear-shape fold so that one is able to adjust the elasticity of the fold by the selection of a more or less elastic material for the insert member.

Numerous advantages are obtained from the present invention. Among those, to mention only a few, is the simplicity in manufacture and assembly of the clamp and its parts. The band material only requires apertures near the ends which can be readily punched out in mass production at predetermined intervals to provide band strips of predetermined size. In the alternative, a band material such as shown in my U.S. Pat. 2,847,742 may be used which can be stocked in reels. The desired length of band can then be cut off from the reel, and it is only necessary to cut out the web portion between two adjacent apertures in the band to form an aperture of sufficient size to accommodate the fold. However, a band may also be provided which, as manufactured, provides apertures of suitable size to accommodate the fold of commensurate size and shape.

The manufacture of the ear-shaped fold, as such, does not involve any special problems and lends itself to mass production from band steel material or the like. As elastic insert member may be used a commercially available, elastic rod of predetermined diameter, which can then be cut to the desired length, corresponding to the axial dimension of the ear-shaped fold. Thus, the present invention not only can be readily manufactured but also offers great versatility to the installer, and additionally can be stocked readily in such a manner that clamps of any desired size and with any number of elastic ears can be made therefrom.

From an operational point of view, the present invention offers the great advantage that, for example, breathing of the hose, caused by rapid pressure fluctuations, can be taken up by the ear-shaped fold without danger of metal fatigue and without danger of increase in the gap and attendant bulging of the hose surface, disadvantages which heretofore could be eliminated only in part by special measures, such as, additional bridging elements and the like.

Accordingly, it is an object of the present invention to provide a clamp, and more particularly a hose clamp of the type described above which eliminates by extremely simple means the aforementioned shortcomings and drawbacks encountered in the prior art.

Another object of the present invention resides in a band clamp which can be easily manufactured and readily installed, yet is equipped with self-adjusting spring means.

A further object of the present invention resides in a band clamp in which two ends of the band are connected by a separate elastic spring element in the form of an ear-shaped fold or lug.

Still another object of the present invention resides in a band clamp of the type described above provided with self-adjusting spring means constituted by ear-shaped folds or lugs in which forces seeking to enlarge the circumference of the clamp cause contraction of the inner ends of the ear-shaped fold.

A still further object of the present invention resides in a band clamp, offering great versatility in use, which effectively precludes bulging of the hose at the place or places of the elastic spring elements and which, at the same time minimizes the danger of metal fatigue in the elastic spring material.

These and further objects, features, and advantages of the present invention will become more obvious from the following description when taken in connection with the accompanying drawing which shows, for purposes of illustration only, several embodiments in accordance with the present invention, and wherein:

FIG. 1 is a perspective, exploded view of a clamp in accordance with the present invention;

FIG. 2 is a longitudinal cross-sectional view through the band with the connecting fold or lug inserted into overlapping band ends in accordance with the present invention;

FIG. 3 is a partial perspective view of a hose clamp in accordance with the present invention, in which the elastic insert member has been omitted for sake of clarity;

FIG. 4 is an elevational view of the ear-shaped fold or lug in accordance with the present invention;

FIG. 5 is a longitudinal cross-sectional view through a band clamp in accordance with the present invention, on a reduced scale, which is provided with a plurality of circumferentially spaced elastic spring elements connecting adjacent band ends; and FIG. 6 is a modified embodiment in accordance with the present invention in which some of the band ends are connected by means of elastic spring elements in accordance with the present invention while the clamp is adapted to be closed and contracted by a bridging member adapted to be contracted.

Referring now to the drawing wherein like reference numerals are used throughout the various views to designate like parts, and more particularly to FIGS. 1 through 4, reference numerals 11a and 11b generally designate the end portions of a band made from suitable steel band material. The band ends 11a and 11b are provided with equi-spaced, substantially rectangular apertures 12a and 12b separated from each other by transversely extending web portions 13a and 13b, respectively. A substantially larger rectangular aperture 14a and 14b is formed near each end of the respective band which is delimited in the circumferential direction by the end webs 15a and 15b and by the web portion 13a' and 13b', respectively. When using a band material such as shown in FIG. 2 of my prior U.S. Pat. 2,847,742, the apertures 14a and 14b may be readily obtained by merely cutting out a web portion, for example, that web portion which in the band as initially manufactured, is located next to the web end portion 15a and 15b and which has been shown in the drawing in dash and dot lines and designed therein by reference numerals 16a and 16b. However, it is understood that a flat band material of any suitable type, with or without any other apertures, may be used into which the apertures 14a and 14b are either cut beforehand or punched out by suitable tools as needed.

The elastic spring element generally designated by reference numeral 20 includes an ear-shaped lug or fold portion 21 of approximately omega-shape or similar, suitable configuration which passes over near its inner ends into the circumferentially extending leg portions 22 and 23 by way of rounded-off transitional portions 24 and 25 which have relatively small, but well-defined radii of curvature so as to minimize stress concentrations at these places.

For purposes of assembly, the two ends 11a and 11b of the band are placed overlapping each other with the apertures 14a and 14b in substantial alignment. The elastic spring element 20 is thereupon inserted with its lug portion 21 through the apertures 14a and 14b from the inside of the clamp. In order to facilitate assembly, especially when several elastic spring elements 20 are to be used to connect several band ends, an elastic, cylindrical member 30 having an axial length approximately corresponding to the axial dimension of the ear-shaped fold portion 21 is inserted into the latter. The cylindrical insert member 30 may thereby be cut in a simple manner from a rod-shaped supply. As is obvious, the inherent springiness of the ear-shaped fold portion 21 will be reinforced by the elastic properties of the insert element 30 so that by selecting a more or less elastic material for the insert member 30, one is able to control the elastic properties of the fold or lug portion 21 within certain limits.

FIG. 5 illustrates a band clamp consisting of five band sections 111, whereby overlapping adjacent ends thereof are connected with each other by means of elastic self-adjusting spring elements 120 in the manner as shown and described in connection with FIGS. 1 through 4. Again, suitable insert members 130 of elastic material may be provided in the ear-shaped lug or fold portions of the spring elements 120.

FIG. 6 illustrates a clamp consisting of three band sections 211 whereby two elastic spring elements with ear-shaped folds or lugs and generally designated by reference numeral 220 interconnect respectively overlapping portions of the band sections while a bridging member generally designated by reference numeral 225, which may be, for example, of the type disclosed in my prior U.S. Pat. No. 2,847,742, engages with its hooks 226 into appropriate apertures provided in the band material while its fold consisting of generally outwardly extending leg portions 227 and 227' interconnected by a web portion 228 is adapted to be contracted by the application of forces near the inner ends of the leg portions 227 and 227' so as to form an ear-shaped fold or lug portion approximately similar to the fold 21 of FIG. 4. Of course, whereas at least the fold or lug portions of elastic spring elements 20, 120 and 220 are made of any suitable material capable of being elastically deformed and bent to a high degree without causing any permanent deformations, i.e., of a material whose elastic limit is high in contrast to soft steel as normally used for hose clamps, the material for the U-shaped fold 227, 227', 228 of the bridge member 225 must be such as to permit deformation thereof. A heat-treated, tough, but not brittle, spring steel or bands of chrome-nickel steel, bronze bands, synthetic plastic materials, aluminum alloys, etc. may be used for the lugs or folds of the elastic spring elements 20, 120 and 220 whereas a deformable material which possesses a relatively insignificant elasticity compared to that of the folds or lugs of the elastic spring elements is used for the lug or fold of the bridging member 225. For example, a carbon steel may be used for the lug or fold of the bridging member 225 which is annealed to receive a deformable structure.

While I have shown and described only several embodiments in accordance with the present invention, it is understood that the same is not limited thereto but is susceptible of numerous changes and modifications as known to a person skilled in the art. For example, the clamp may include one or more elastic spring elements 20. Instead of a bridging member 225, any other known means for closing and tightening the ends of the band may be used, such as more fully described in my aforementioned Swiss patent application No. 8,067/65. Additionally, the lug portion 21, if so desired, may be provided with a reinforcing groove 29 (FIG. 3) extending generally in the circumferential direction. Additionally, in lieu of an elastic insert member 30, a substantially rigid insert may be used whose dimensions may be smaller by a greater or lesser amount than the internal dimensions of the lug portion 21.

In operation, if forces occur within the object to be clamped, for example, within the hose 40, FIGS. 2 and 3, seeking to enlarge the circumferential dimensions of the clamp, the band ends 11a and 11b will be displaced in the direction of arrows 50a and 50b whereby the edges of the web portions 13a and 13b defining the apertures 14a and 14b will apply a force to the external, V-shaped transition portions 24 and 25 seeking to displace the same in such a manner that these transition portions 24 and 25 will approach one another. As a result thereof, instead of being enlarged, the gap 28 will be reduced during the occurrence, for example, of increases in pressure within the hose.

Moreover, instead of circular shape, the band clamp of the present invention may also have any other desired shape, for example, a polygonal shape, and may also clamp together objects, other than a hose to a hose nipple. Consequently, I do not wish to be limited to the details shown and described herein but intend to cover all such changes and modifications as are within the scope of those persons skilled in the art.

I claim:

1. A band clamp, especially for clamps with flat band material, characterized in that two band ends are each provided with aperture means, said band ends being arranged in overlapping relationship with the aperture means thereof aligned, and self-adjusting spring means interconnecting said band ends including approximately ear-shaped fold means extending through said aligned aperture means in such a manner that forces seeking to enlarge the circumferential dimensions of the clamp will seek to decrease the spacing of the inner ends of said fold means.

2. A clamp according to claim 1, wherein said ear-shaped fold means pass over at the inner ends thereof into leg portions extending underneath the band ends in the circumferential direction.

3. A band clamp according to claim 2, wherein the inner ends of said ear-shaped fold means pass over into said leg portions by rounded-off transitional portions.

4. A clamp according to claim 3, wherein said rounded-off transitional portions have relatively small, well-defined radii of curvature to minimize stress concentration.

5. A band according to claim 4, wherein the fold means of a spring means is of approximately omega shape.

6. A band according to claim 5, further comprising reinforcing means in the radially outer portion of said fold means.

7. A band clamp according to claim 6, wherein said reinforcing means is a generally circumferentially extending groove.

8. A clamp according to claim 7, wherein said groove is recessed in the radially inward direction.

9. A clamp according to claim 8, wherein a plurality of tensional spring means are used to connect overlapping ends of several band sections.

10. A band clamp according to claim 8, wherein the band is provided with regularly spaced apertures, said aperture means being constituted by the omission of a web portion between adjacent apertures.

11. A clamp according to claim 10, further comprising closure means for closing said clamp, said closure means engaging with two adjacent band ends.

12. A clamp according to claim 11, wherein said closure means includes fold means having generally outwardly extending leg portions interconnected by a web portion and made of deformable material.

13. A clamp according to claim 11, wherein said closure means includes a mechanical stepping mechanism which contracts the clamp by engaging in consecutive apertures of one band end.

14. A band according to claim 1, wherein fold means of a spring means is of approximately omega shape.

15. A band according to claim 1, further comprising reinforcing means in the radially outer portion of said fold means.

16. A band clamp according to claim 15, wherein said reinforcing means is a generally circumferentially extending groove.

17. A clamp according to claim 16, wherein said groove is recessed in the radially inward direction.

18. A clamp according to claim 1, wherein a plurality of tensional spring means are used to connect overlapping ends of several band sections.

19. A band clamp according to claim 1, wherein the band is provided with regularly spaced apertures, said aperture means being constituted by the omission of a web portion between adjacent apertures.

20. A clamp according to claim 1, further comprising closure means for closing said clamp, said closure means engaging with two adjacent band ends.

21. A clamp according to claim 20, wherein said closure means includes fold means having generally outwardly extending leg portions interconnected by a web portion and made of deformable material.

22. A band clamp according to claim 20, wherein the band is provided with regularly spaced apertures, said aperture means being constituted by the omission of a web portion between adjacent apertures.

23. A clamp according to claim 22, wherein said closure means includes a mechanical stepping mechanism which contracts the clamp by engaging in consecutive apertures of one band end.

References Cited

UNITED STATES PATENTS

| 1,277,076 | 8/1918 | Ireland | 24—20 |
| 1,910,116 | 5/1933 | Malleville | 24—19 |
| 2,393,842 | 1/1946 | Townsley | 24—19 |

FOREIGN PATENTS 778,861    7/1957    Great Britain.

DONALD A. GRIFFIN, Primary Examiner